United States Patent [19]

Kappel

[11] 4,075,438

[45] Feb. 21, 1978

[54] STEREO SPEAKER SYSTEM

[76] Inventor: Gary Kappel, 1630 Centennial Drive, Longmont, Colo. 80501

[21] Appl. No.: 746,842

[22] Filed: Dec. 2, 1976

[51] Int. Cl.[2] .......... H04M 1/04

[52] U.S. Cl. .......... 179/146 H

[58] Field of Search .......... 179/146 H

[56] References Cited

U.S. PATENT DOCUMENTS

| | | | |
|---|---|---|---|
| 1,997,408 | 4/1935 | Holmes | 179/146 H |
| 2,573,186 | 10/1951 | DeMier | 155/174 |
| 2,908,766 | 10/1959 | Taylor | 179/82 |
| 3,512,605 | 5/1970 | McCorkle | 181/141 |

*Primary Examiner*—William C. Cooper

*Attorney, Agent, or Firm*—John E. Reilly; James R. Young

[57] ABSTRACT

A stereo speaker system with two spaced-apart speaker housings is adapted for mounting on the backrest of a chair by attachment thereto with a universal, adjustable mounting bracket. Each speaker housing is adjustably supported on opposite sides of the space occupied by a person's head while sitting in the chair by a support arm adjustably connected to the speaker housing on one end and adjustably connected to the mounting bracket on the opposite end. The mounting bracket has downwardly extending members for gripping the front and rear surfaces of the chair backrest, the space between the front gripping members and the rear gripping members being adustable for removable mounting on the chair and for mounting on a variety of chairs with varying sizes of backrests.

16 Claims, 12 Drawing Figures

STEREO SPEAKER SYSTEM

BACKGROUND OF THE INVENTION

This invention relates generally to stereophonic speaker systems, and more specifically to stereophonic speakers attached to a seat or chair for personalized listening pleasure.

Stereophonic sound reproduction is common and well-known in the art, and usually requires at least two separate speakers, each speaker being used for the purpose of reproducing a separate portion of the total sound. Since the most desirable feature of stereophonic sound reproduction is the audible impression that the separate portions of the total sound are emanating from distinctly different sources, it is desirable to position the speakers in spaced-apart relation to each other, preferably with at least some component of the distance therebetween being on opposite sides of the listener. The specific positioning and arrangement of the speakers can vary from separate speakers placed at divers locations in the listening area, such as on opposite walls of a room, to headphones with a separate speaker placed on each ear of the listener. Speakers placed in divers locations in a room some distance from the listener can result in good quality stereophonic listening; however, the sound must usually be reproduced at a higher volume, and it is subject to interruption and interference by foreign activities and noises within the room. A headset with separate earphones eliminates the foreign noise interference and the adverse effects of increased volume which may bother others in the vicinity who do not desire to listen to the reproduced sound, but they are somewhat uncomfortable and subject the listener to a somewhat artificial experience of having each separate portion of the total sound being heard in only one ear.

Many different devices have been devised to provide speaker arrangements intermediate of the two extremes described above, which usually include positioning at least one speaker in relatively closely spaced relation on each side of the listener's head. Such arrangements provide the advantages of low-volume listening enjoyment with a minimum of external noise interference, as well as allowing the listener to enjoy the music in a comfortable position without the uncomfortable and artificial effects of hearing the different sources of sound in separate ears. Examples of these kinds of speaker apparatus include two speakers with individual supports for standing on opposite sides of a chair disclosed in U.S. Pat. No. 2,161,995 issued to A. Cahill; a backrest cover with pockets therein for holding individual speakers for use on passenger seats such as an airplane disclosed in U.S. Pat. No. 2,908,766 issued to G. Taylor; specialized headrest device having individual speakers built therein for dental chairs shown in U.S. Pat. No. 3,230,320 issued to K. Kerr; a pillow with individual speakers enclosed therein such as those disclosed in U.S. Pat. Nos. 3,290,450, issued to D. Majoros and 3,416,804, issued to C. Christie; a specialized headrest for automobile seats with a mounting bracket attached to a structural rail in the backrest of the automobile seat disclosed in U.S. Pat. No. 3,512,605 issued to D. McCorkle; the specialized headrest with individual speakers mounted therein on a free-standing support for placing behind or alongside a chair shown in U.S. Pat. No. 3,870,834 issued to R. Yeaple; and specialized headrest for automobile seats mounted on a post extending upward from the vehicle seat as disclosed in U.S. Pat. No. 3,944,020 issued to R. Brown.

Another concept developed to accomplish the above-described purposes includes an enclosed environment defined by a partial shell with individual speakers mounted therein in spaced-apart relation, such as the acoustical chamber in the form of a hood which the listener places over his head as disclosed in U.S. Pat. No. 3,237,713, issued to J. Leslie, and the acoustical chair into which the listener positions the major portion of his entire body as disclosed in U.S. Pat. No. 3,452,836, issued to A. Carsello.

While all of these different speaker arrangements and apparatus have been successful in accomplishing the desired goals to some extent, they lack versatility and conformability for use in varying environments and locations due to their cumbersome structures or their adaptation to specific applications or mounting structures which are not convenient for use in other locations or situations.

SUMMARY OF THE INVENTION

Accordingly, it is an object of the present invention to provide a novel and improved stereo speaker system for personalized listening enjoyment which is capable of quality sound reproduction and distribution in the listener's immediate environment as well as being portable and easy to move.

It is another object of the present invention to provide a stereo speaker arrangement which is universally mountable on and removable from the backrest of a wide variety of chair shapes and sizes.

It is still another object of the present invention to provide such a stereo speaker arrangement wherein the separate speaker housings are individually adjustable in a wide range of positions to provide optimum sound distribution for a listener while occupying different positions in a chair.

The stereo speaker system includes two spaced-apart speaker housings, each housing being adjustably attached to a mounting bracket which is adapted for removable attachment to the backrest of an overstuffed easy chair. The mounting bracket includes gripping devices for clamping the mounting bracket to the backrest of the chair, the distance between the front and rear gripping devices being adjustable to accommodate chairs of various sizes with different thicknesses on their backrests.

Each speaker housing, which contains at least one speaker, and preferably two for increased sound quality, is supported by an arm adjustably attached on one end to the speaker housing and on the other end to the mounting bracket. In one embodiment, the ends of the support arms are slidably and rotatably received in a sleeve provided with a set screw for retaining the arm in a selected position, and in another embodiment, the support arms are connected to the speaker housing and the mounting bracket with ball and socket joints.

BRIEF DESCRIPTION OF THE DRAWINGS

Other objects, advantages, and capabilities of the present invention will become apparent as the description proceeds taken in conjunction with the accompanying drawings, in which.

DETAILED DESCRIPTION OF THE PREFERRED EMBODIMENT

Figure 3:
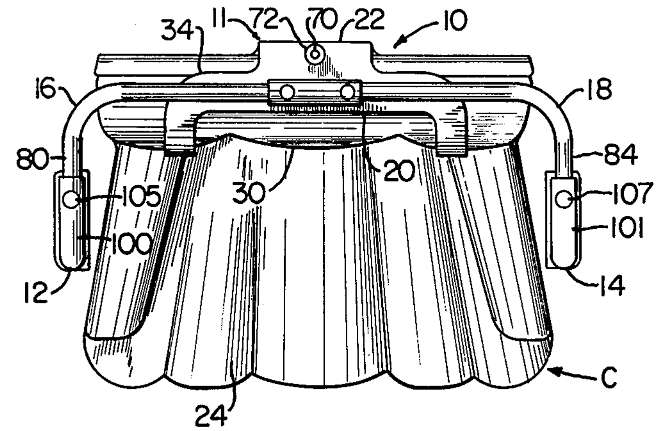
FIG. 3 is a plan view of the speaker system mounted on the backrest of an overstuffed chair.
Figure 1:
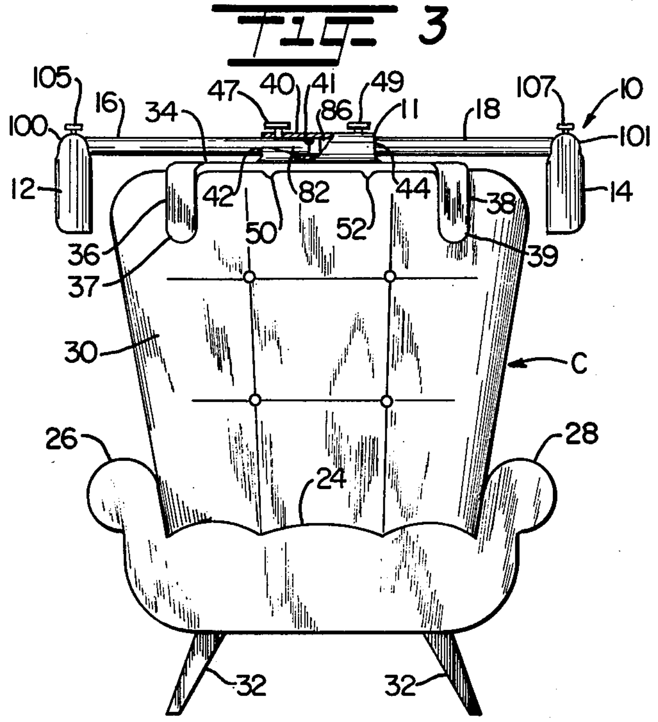
FIG. 1 is an elevation view of the stereo speaker system mounted on an overstuffed chair, a portion of the sleeve in the mounting bracket being cut away to reveal the interrelation of the various parts therein.
Figure 2:
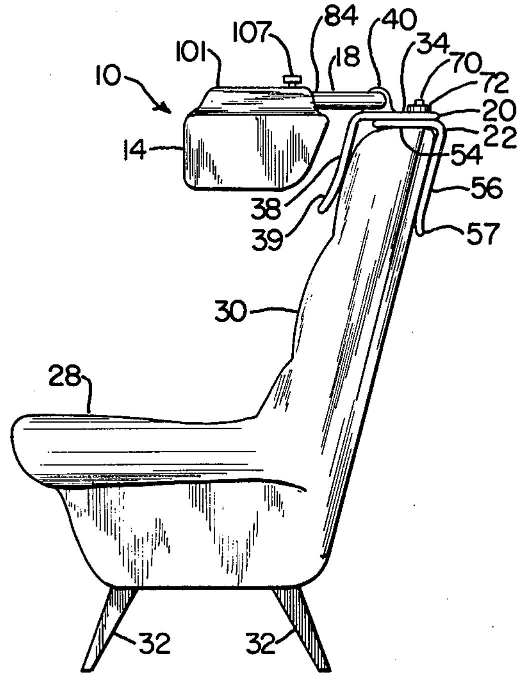
FIG. 2 is a side elevation of the speaker system mounted on the bracket of an overstuffed chair.
Figure 5:
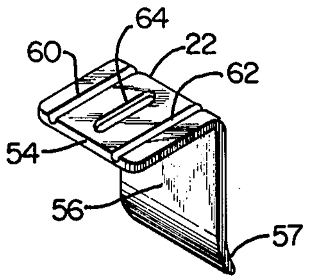
FIG. 5 is a perspective view of the rear portion of the mounting bracket.

A stereo speaker system 10 in accordance with the present invention in FIGS. 1 through 3 removably mounted in position on the backrest 30 of an overstuffed easy chair C. As a setting for the present invention, the chair C is conventional and includes a seat portion 24, arm rests 26, 28, backrest 30, and legs 32. In turn, the basic components of the stereo speaker system 10 primarily comprise two speaker housings 12, 14 supported in spaced-apart relation over the chair C by support arms 16, 18, attached to mounting bracket 11.

Mounting bracket 11 includes a front portion 20 adjustably attached to the rear portion 22 by bolt 70 and nut 72. The front portion 20 includes a horizontal section 34 and two spaced-apart members 36, 38 extending downwardly from the forward edge of the horizontal section 34 for gripping the front surface of the seat back 30, and the rear portion 22 likewise includes a horizontal section 54 and a rear gripping member in the form of a back plate 56 extending downwardly from the rear edge of the horizontal section 54 for gripping the rear surface of the seat back 30. The distal ends 37, 39 of members 36, 38, respectively, and the distal end 57 of member 56 are curved slightly outwardly to minimize the possibility of those ends tearing or causing wear spots in the fabric of the chair as said members are being slipped into position on the chair or while mounted in that position. Also, the mounting bracket 11 can be formed with a slightly obtuse angle between the horizontal section 34 and each gripping member 36, 38, respectively, of the front portion 20, and an acute angle between the horizontal section 54 and gripping member 56 of rear portion 22 to more closely conform to a chair C with its back 30 inclined slightly backward, as shown in FIG. 2.

A slotted hole 64 with its longer dimension oriented forward and backward in relation to the chair C is provided through the horizontal section 54 of rear portion 22, and a hole 35 is provided through horizontal section 34 of front portion 20 in alignment with slotted hole 64. The front and rear portions 20, 22 are adjustably secured together by bolt 70 which extends through both slotted hole 54 and hole 35, and can be snugly tightened against each other by nut 72 threaded on bolt 70. Consequently, the distance between the front gripping members 36, 38 and the rear gripping member 56 can be adjustably varied to accommodate different sized backrests 30 of different chairs by loosening the nut 72 on bolt 70, sliding the front portion 20 in relation to the rear portion 22, and when the proper distance in obtained to securely clamp the mounting bracket 11 onto the backrest 30, and then securely tightening down nut 72.

Figure 6:
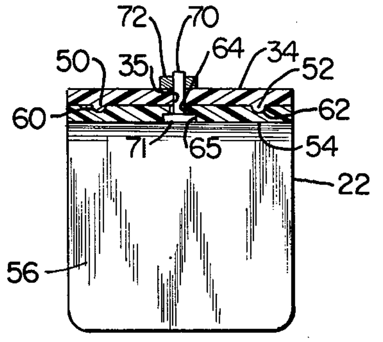
FIG. 6 is a sectional view of the mounting bracket taken along line 6—6 in FIG. 4.

In order to maintain the front gripping members 36, 38, in parallel relation with the rear gripping member 56, ribs 50, 52 are provided on the lower surface of horizontal section 34 of the front portion 20, and mating grooves 60, 62 of corresponding size and shape are provided in the upper surface of horizontal section 54 of rear portion 22. When the front portion 20 and back portion 22 are properly aligned, ribs 50, 52 protrude into mating engagement with grooves 60, 62, respectively. Consequently, relative forward and backward motion between the front portion 20 and rear portion 22 is allowed, but relative lateral or twisting movement is prevented. As best seen in FIG. 6, one set of rib 50 and groove 60 is located in spaced relation to one side of the slotted hole 64, and the other set of rib 52 and groove 62 is located a spaced distance on the opposite side of slotted hole 64. Also, as best seen in FIG. 6, slotted hole 64 includes a widened portion 65 in the lower surface of horizontal section 54 to accomodate the head 71 of bolt 70 both to keep the head 71 from protruding below the remainder of the horizontal section 54 to preclude undue wearing or marking of the fabric on the chair C, and to retain the bolt 70 from turning as the nut 72 is screwed on or off.

Figure 8:
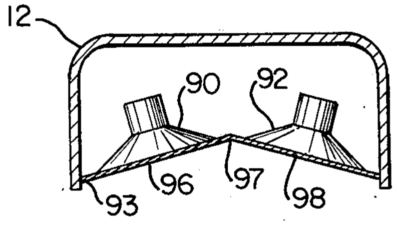
FIG. 8 is a sectional view of the speaker housing taken along line 8—8 of FIG. 7.
Figure 10:
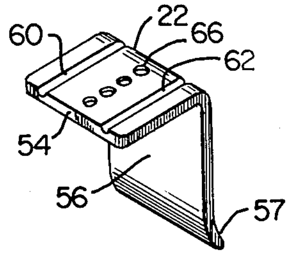
FIG. 10 is a perspective view of the rear portion of the alternate embodiment of the mounting bracket.
Figure 9:
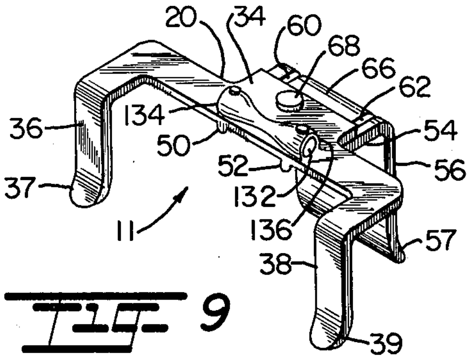
FIG. 9 is a perspective view of an alternate embodiment of the mounting bracket.

Two speakers 90, 92, preferably a woofer and a tweeter, are mounted in each speaker housing 12 on a facia panel 93. The facia panel 93 is comprised of two panel segments 96, 98 in a concave configuration enjoined together at 97, as best seen in FIG. 8. Grille screens or fabric 94, 95 are stretched over the speaker openings in panel 93 in the conventional manner to protect the speakers 90, 92 from dust or damage. This concave configuration of the facia panel 93 results in both speakers 90. 92 being aimed substantially at a focal point near the listener's head.

Figure 7:
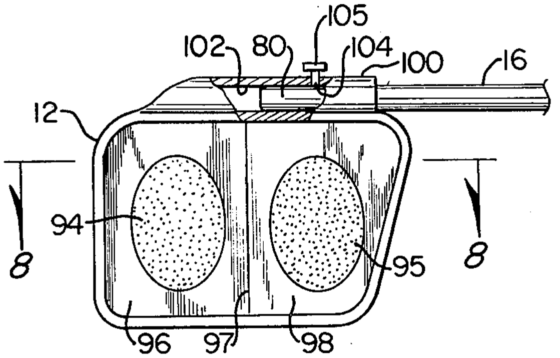
FIG. 7 is an inside elevation view of the right speaker housing, a portion of the sleeve being cut away to reveal the interrelation of the parts therein.

As best seen in FIG. 7, a cylindrical sleeve 100 with a bore 102 extending inwardly from one end is integrally molded in the upper section of speaker housing 12. A radial internally threaded hole 104 is included in the wall of the sleeve 100, and a set screw 105 is threaded therein. One end 80 of a support arm 16 is slidably inserted into the sleeve 100 and can be secured in any desired position therein by tightening set screw 105 onto the arm 16. The left speaker housing 14 is also provided with a similar sleeve 101 and set screw 107 for receiving the end 84 of the left support arm 18, as best seen in FIGS. 1 through 3.

Figure 4:
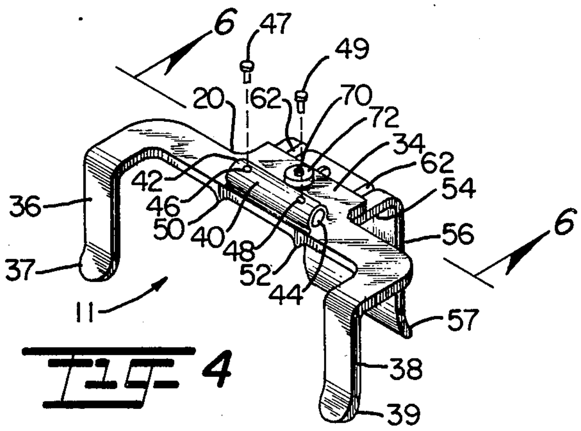
FIG. 4 is a perspective view of the assembled mounting bracket.

The opposite ends of support arms 16, 18 are adjustably attached to the mounting bracket 11 as best seen in FIGS. 1 through 3. For this adjustable attachment, an elongated sleeve 40 is rigidly attached on the upper surface of horizontal section 34 of front portion 20. The cylindrical sleeve 40 has a bore 41 extending longitudinally therethrough from right end 42 to left end 44. (See also FIG. 4.) The ends 82, 86 of support arms 16, 18, respectively, opposite those attached to the speaker housings 12, 14, respectively, are received in opposite ends 42, 44 of sleeve 40. End 82 of support arm 16 is slidably inserted into end 42 of sleeve 40, and end 86 of support arm 18 is slidably received in end 44 of sleeve 40. Sleeve 40 also includes two spaced-apart internally threaded holes 46, 48 into which set screws 47, 49, respectively, can be screwed for snugly engaging support arms 16, 18, respectively. Thus, speaker housings 12, 14 can be adjustably set inwardly and outwardly in relation to the chair C by sliding their respective ends 82, 86 in sleeve 40, and they can be adjusted upwardly and downwardly by rotating arms 16, 18 in sleeve 40. Speaker housing 12, 14 can also be adjusted forwardly and rearwardly by sliding arms 16, 18 respectively the desired distances into sleeves 100, 101, respectively. Also, by rotating speaker housing 12, 14 on support arms 16, 18, respectively, the speakers 90, 92 can be adjustably directed upwardly or downwardly. These adjustable features allow an individual listener some latitude for positioning the respective speaker housing 12, 14 in locations that best suit his particular height, position of most comfort in the chair, and hearing ability in each ear.

Although not shown, it can be readily understood by one skilled in the art that electrical wires must be provided to power the speakers. The support arms 16, 18 are fabricated with hollow cores to accommodate passage of wires therethrough from the mounting bracket 11 to the respective speaker housings 12, 14 and appropriate conduits or ducts can be provided in the bracket 11 and speaker housings 12, 14 to lead the wires into the support arms and to the speakers 90, 92.

The components of the alternate embodiments illustrated in FIGS. 9 through 12 are quite similar to those just described in the preferred embodiment, including speaker housings 12, 14, support arms 16, 18, and mounting brackets 11 with front portion 20 and back portion 22. However, instead of the slotted adjustment hole 64 in the preferred embodiment, the alternate embodiment includes a plurality of individual internally threaded holes 66 through the horizontal section 54 of rear portion 22. A set screw 68 is inserted through the hole 35 in horizontal section 34 of front portion 20 and is screwed into a selected one of the holes 66 which provides the desired spacing between the front gripping legs 36, 38 and the rear gripping plate 56.

Figure 11:
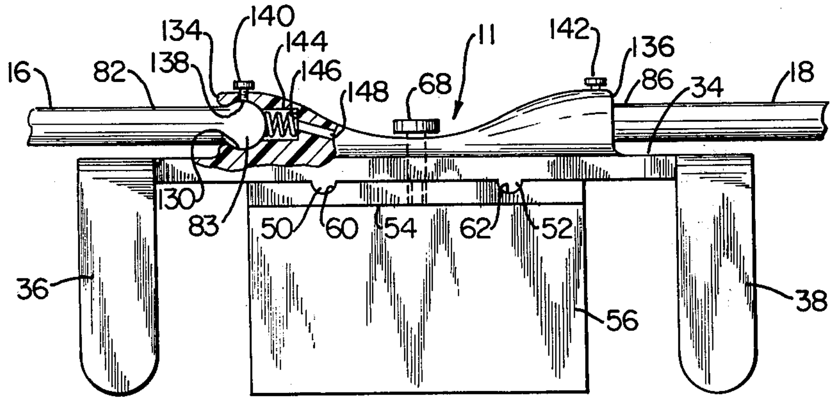
FIG. 11 is a front elevation view of the alternate embodiment of the mounting bracket, a portion of the socket housing being cut away to reveal the interrelation of the parts therein.
Figure 12:
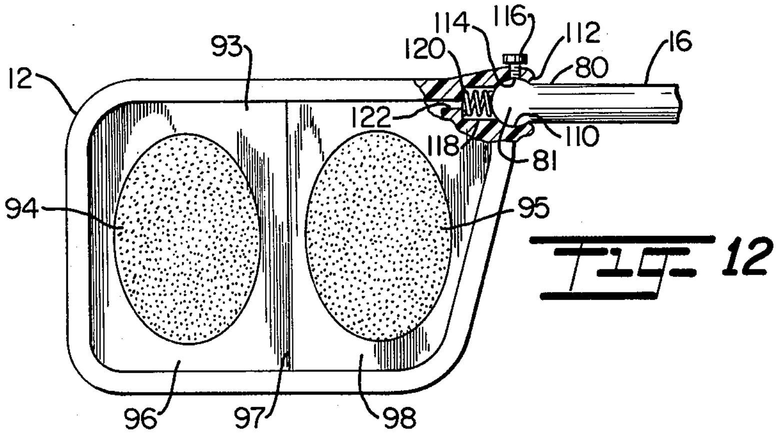
FIG. 12 is an inside elevation view of the right speaker housing, a portion of the socket housing being cut away to reveal the interrelation of parts therein.

Also, as best seen in FIGS. 11 and 12, the support arms 16, 18 are asjustably connected to the speaker housings 12, 14, respectively, and to the mounting bracket 11 by ball and socket joints. An enlarged ball insert 83 is provided on the rear end 82 of support arm 16 and is positioned in a correspondingly sized and shaped socket 130 on the horizontal section 34 of front portion 20. An annular lip 134 retains the ball insert 83 in socket 130, but rotational as well as forward/backward and up/down adjustment of support arm 16 in socket 130 is accommodated. A spring 146 in chamber 144 can be provided to bias the ball insert 83 against lip 135 to frictionally maintain support arm 16 in the desired set position. A radial internally threaded hole 138 can also be provided in the wall of socket 130 for receiving a set screw 140 to maintain support arm 16 in the desired adjusted position as an alternative to or in addition to the bias spring 146. A conduit 148 is also provided through which electrical wires can be run into the hollow core support arm 16 to the speakers 90, 92. The rear end 86 of support arm 18 is similarly adjustably connected to mounting bracket 11 with socket 132 and annular lip 136 and set screw 142 for a bias spring (not shown) to retain the support arm 18 in position.

A similar ball joint connection is provided to attach speaker housing 12 to support arm 18 as best seen in FIG. 12. An enlarged ball-shaped insert 81 is provided on the forward end 80 of support arm 16 and is positioned in the correspondingly sized and shaped socket 110 in speaker housing 12. An annular lip 112 retains the ball insert 81 in socket 110, and a spring 120 in chamber 118 biases the ball insert 81 against the lip 112 to frictionally retain it in any desired adjusted position. Also, a set screw 116 can be threaded into a radial hole 114 in the socket wall to engage ball insert 81 to retain it in the desired adjusted position either in addition to or an alternative to the spring 120. The conduit 122 is provided to lead the electrical wires from support arm 16 into the speaker housing 12 for connection to speakers 90, 92.

Although the present invention has been described with a certain degree of particularity, it is understood that the present disclosure has been made by way of example and that changes in details and structure may be made without departing from the spirit thereof.

What is claimed is:

1. A portable speaker apparatus adapted for attachment to a chair having a backrest portion thereon, comprising:

a speaker housing having a speaker mounted therein;

a mounting bracket including front and rear gripping means having a space therebetween for receiving the backrest portion for removably attaching said mounting bracket to the backrest of the chair, said mounting bracket also including adjustment means for adjusting the space between said front and rear gripping means according to the thickness of the backrest portion of the particular chair on which the speaker apparatus is being attached; and a support arm connected on one end to said speaker housing and connected on its opposite end to said mounting bracket, said support arm being operative to support said speaker housing in a position forward from the backrest of the chair near the space occupied by a person's head when he is sitting in the chair.

2. The speaker apparatus of claim 1, wherein said mounting bracket includes a front portion with a horizontal segment and front gripping means extending downwardly from its forward edge, and a rear portion with a horizontal segment and front gripping means extending downwardly from its rear edge, the horizontal segment of said front portion laying in overlapping relation on said horizontal segment of said rear portion and being adjustably fastened together by said adjustment means.

3. The speaker apparatus of claim 2, wherein said adjustment means includes said horizontal segment of said rear portion with a slotted hole therein, said horizontal segment of said front portion with a hole therein in alignment with said slotted hole through both of said holes to tighten said front portion onto said rear portion to inhibit sliding movement of said front portion in relation to said rear portion.

4. The speaker apparatus of claim 3, wherein the slotted hole in said rear portion includes a narrow upper portion to accommodate the shank of said bolt and a wide lower section to accommodate the head of said bolt, said wide lower portion being recessed deep enough in the lower surface of said rear portion to receive substantially the entire bolt head such that it does not protrude from the lower surface of said rear portion thereby precluding damage to the fabric on the back of the chair, and a nut threadedly received on the shank of the bolt for tightening onto the upper surface of said front portion.

5. The speaker apparatus of claim 2, wherein said adjustment means includes said horizontal segment of said front portion with a hole therein, said horizontal portion of said rear portion with a plurality of internally threaded holes therein in spaced-apart relation to each other, each of said holes in said rear portion being selectively alignable with said hole in said front portion, and a set screw inserted through said hole in said front portion and threadedly received into one of said holes in said rear portion, whereby tightening the head of the set screw onto the upper surface of said front portion precludes said front portion from slidable moving in relation to said rear portion.

6. The speaker apparatus of claim 2, including an elongated rib on the lower surface of said front portion and a corresponding elongated groove in the upper surface of said rear portion, said rib and groove being aligned to coact with each other to maintain front and rear portions in proper alignment and orientation to the back of the chair.

7. The speaker apparatus of claim 2, including first adjustable attachment means for connecting one end of said support arm to said speaker housing and second adjustable attachment means for connecting the opposite end of said support arm to said front portion of said bracket.

8. The speaker apparatus of claim 7, wherein said first adjustable attachment means includes a cylindrical sleeve in said speaker housing with an axial bore extending inwardly from one end for receiving said one end of said support arm, said speaker housing sleeve having an internally threaded radial hole in its lateral side, and a set screw for screwing into said hole and into frictional engaging contact with said support arm to firmly hold said speaker housing in a desired position in relation to said support arm, and said second adjustable attachment means includes a cylindrical sleeve in said front portion of said bracket with an axial bore extending through said sleeve for receiving said opposite end of said support arm, said bracket sleeve having an internally threaded radial hole in the lateral side of said bracket sleeve, and a set screw for screwing into said hole and into frictional engaging contact with said support arm, whereby said support arm can be set and retained in desired positions in relation to said bracket.

9. The speaker apparatus of claim 7, wherein said first adjustable attachment means includes a ball-shaped insert on one end of said support arm and a correspondingly shaped and sized socket in said speaker housing, whereby when said ball-shaped insert is positioned in said speaker socket, said speaker housing can be set in a desired position in relation to said support arm, and said second adjustable attachment means includes a ball-shaped insert on the opposite end of said support arm and a correspondingly shaped and sized socket in said bracket, whereby when said ball-shaped insert is positioned in said bracket socket, said support arm can be set in a desired position in relation to said bracket.

10. The speaker apparatus of claim 9, wherein each of said speaker and bracket sockets is spring-loaded to retain said ball-shaped inserts on said support arm in snug frictional engagement with the walls of said sockets.

11. The speaker apparatus of claim 9, wherein each of said speaker and bracket sockets has an internally threaded radial hole in its wall and a set screw for screwing into said hole and into frictional engaging contact with said ball-shaped insert in said socket for retaining said support arm in desired position in relation to said speaker housing and said bracket.

12. The speaker apparatus of claim 2, wherein said front gripping means includes two rigid spaced-apart members with enough distance therebetween so as to not interfere with a person's head when the person is sitting in the chair, and said rear gripping means includes a wide plate member.

13. A stereo speaker system, comprising:

two speaker housings with a speaker in each housing, and adjustable support means attached to each of said housings for supporting said speaker housings in spaced-apart relation on a chair, said support means including clamping means with downwardly extending front gripping members and a downwardly extending rear gripping member for tightly engaging the backrest portion of a chair therebetween, said clamping means being adjustable to vary the space between said front and rear gripping members, whereby said support means can be conventiently mounted on and removed from chairs with different sized and shaped backrests.

14. The stereo speaker system of claim 13, wherein said support means includes two adjustable arms, each of said arms being connected to opposite of said speaker housings, respectively, to support said speaker housings in a range of desired positions in the vicinity of a person's head while he is occupying the chair.

15. The stereo speaker system of claim 14, wherein said support means includes a sleeve with a bore extending therethrough with an opening at both ends, each of said speaker housings includes a sleeve with an opening on one end, and each of said arms is attached to opposite of said speaker housings by insertion of one end of said arm into said sleeve in said speaker housing, and each of said arms is attached to said support means by insertion of the opposite end of said arm into said sleeve in said support means.

16. The stereo speaker system of claim 14, wherein each of said speaker housings includes a ball-shaped socket, said support means includes two ball-shaped sockets, each of said arms includes an enlarged ball-shaped insert on each end, and each of said arms is adjustably connected at one end to one of said speaker housings by one of said inserts being positioned in said socket in said housing and is adjustably connected at the opposite end to said support means by the other of said inserts being positioned in said socket in said support means.

* * * * *